US011286897B2

(12) United States Patent
Bang

(10) Patent No.: US 11,286,897 B2
(45) Date of Patent: *Mar. 29, 2022

(54) CONTROL METHOD FOR ISG OF VEHICLE PROVIDED WITH MANUAL TRANSMISSION AND VEHICLE OF WHICH THE CONTROL METHOD IS APPLIED

(71) Applicants: HYUNDAI MOTOR COMPANY, Seoul (KR); KIA MOTORS CORPORATION, Seoul (KR)

(72) Inventor: Jung Hwan Bang, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 31 days.

This patent is subject to a terminal disclaimer.

(21) Appl. No.: 16/878,187

(22) Filed: May 19, 2020

(65) Prior Publication Data
US 2021/0088016 A1    Mar. 25, 2021

(30) Foreign Application Priority Data
Sep. 20, 2019 (KR) .......................... 10-2019-0116109

(51) Int. Cl.
*F02N 11/08* (2006.01)
*F16H 63/50* (2006.01)
(Continued)

(52) U.S. Cl.
CPC ......... *F02N 11/0833* (2013.01); *B60W 10/06* (2013.01); *B60W 10/11* (2013.01);
(Continued)

(58) Field of Classification Search
CPC ......... F02N 11/0833; F02N 2200/0802; F02N 2200/103; B60W 10/06; B60W 10/11;
(Continued)

(56) References Cited

U.S. PATENT DOCUMENTS

| 2012/0083389 A1* | 4/2012 | Morita ................ B60W 10/02 477/185 |
| 2014/0088853 A1* | 3/2014 | Christen ............... F02N 11/103 701/112 |

(Continued)

FOREIGN PATENT DOCUMENTS

GB         2413999 B     8/2008

*Primary Examiner* — Edwin A Young
(74) *Attorney, Agent, or Firm* — Lempia Summerfield Katz LLC

(57) ABSTRACT

A control method of controlling an idle stop-and-go (ISG) function of a vehicle provided with a manual transmission includes: determining, by a controller, whether an ISG function activation condition is satisfied based on vehicle running state information of the vehicle; stopping an engine, by the controller, when the ISG activation condition is satisfied; determining, by the controller, whether a first starting condition in which a shift stage of the manual transmission is a neutral stage is satisfied; determining, by the controller, whether a second starting condition in which a shift stage of the manual transmission is a driving stage is satisfied; and restarting, by the controller, the engine when the first starting condition or the second starting condition is satisfied. The vehicle running state information includes: an operation information of the manual transmission and a clutch pedal, and current and recorded vehicle speeds of the vehicle.

9 Claims, 3 Drawing Sheets

(51) Int. Cl.
    *B60W 10/11*     (2012.01)
    *B60W 10/06*     (2006.01)
    *F02D 41/30*     (2006.01)
    *F02D 41/06*     (2006.01)
    *F02D 41/04*     (2006.01)
    *B60W 30/18*     (2012.01)

(52) U.S. Cl.
    CPC ..... *B60W 30/18018* (2013.01); *F02D 41/042* (2013.01); *F02D 41/062* (2013.01); *F02D 41/30* (2013.01); *F16H 63/50* (2013.01); *B60W 2510/10* (2013.01); *B60W 2520/10* (2013.01); *B60W 2540/12* (2013.01); *B60W 2540/14* (2013.01)

(58) Field of Classification Search
    CPC ....... B60W 30/18018; B60W 2510/10; B60W 2520/10; B60W 2540/12; B60W 2540/14; F02D 41/042; F02D 41/062; F02D 41/30; F16H 63/50
    See application file for complete search history.

(56) References Cited

U.S. PATENT DOCUMENTS

| | | | |
|---|---|---|---|
| 2015/0167614 A1* | 6/2015 | Malone | B60W 10/11 701/54 |
| 2015/0361910 A1* | 12/2015 | Ko | F02N 11/0833 477/107 |
| 2016/0245203 A1* | 8/2016 | Petridis | F02N 11/10 |
| 2017/0113693 A1* | 4/2017 | Bularz | B60W 30/18054 |
| 2021/0024071 A1* | 1/2021 | Bang | B60W 10/02 |

* cited by examiner

CONTROL METHOD FOR ISG OF VEHICLE PROVIDED WITH MANUAL TRANSMISSION AND VEHICLE OF WHICH THE CONTROL METHOD IS APPLIED

CROSS-REFERENCE TO RELATED APPLICATION

This application claims priority to and benefits of Korean Patent Application No. 10-2019-0116109, filed on Sep. 20, 2019, the entire contents of which are incorporated herein by reference.

FIELD

The present disclosure relates to a method for controlling an Idle Stop & Go (ISG) function of a vehicle provided with a manual transmission and a vehicle to which the method is applied, and more particularly, to an ISG control method of a vehicle provided with a manual transmission in which an engine stopping period is extended, and a vehicle to which the method is applied.

BACKGROUND

The statements in this section merely provide background information related to the present disclosure and may not constitute prior art.

Efforts are being made to reduce carbon dioxide levels generated during combustion of vehicles around the world, and at the same time, there is a search for ways to improve fuel efficiency of vehicles in line with the era of high oil prices.

As one method to meet these efforts, an ISG (idle stop & go) system has been proposed. In fact, it has been proved that the ISG system can reduce the amount of carbon dioxide generated by vehicles and at the same time can improve the fuel efficiency.

Herein, the ISG system is an engine control method that stops driving of the engine when the vehicle is decelerated or stopped so that the engine does not burn fuel, and subsequently drives the engine again when the vehicle starts to move.

The ISG system receives information such as a vehicle speed, an engine rotation speed, and a coolant temperature, and commands the engine to stop when idling. In other words, the ISG system automatically stops an idling engine when the vehicle decelerates or stops because of signal waiting or the like during urban driving, and restarts the engine when the vehicle is intended to start after a predetermined time. The ISG system is sometimes referred to as an idling stop controller. The ISG system can reduce a fuel consumption by approximately 5 to 15% in an actual fuel consumption mode. A vehicle equipped with such an ISG system is called an ISG vehicle.

Since the ISG system stops engine combustion when a vehicle is decelerating or stopping, it does not use fuel, and thus it is possible to improve fuel efficiency of the vehicle and to not emit a carbon dioxide concentration.

However, we have discovered that a currently applied ISG system operates at a vehicle speed of about 5 kph or less, so the fuel efficiency gain is limited.

The above information disclosed in this Background section is only for enhancement of understanding of the background of the present disclosure, and therefore it may contain information that does not form the prior art that is already known to a person of ordinary skill in the art.

SUMMARY

The present disclosure provides an ISG control method of a vehicle provided with a manual transmission that extends an engine stopping period and smoothly restarts an engine to improve driving convenience, and a vehicle to which the method is applied.

In one form of the present disclosure, a control method of controlling an idle stop-and-go (ISG) function of a vehicle provided with a manual transmission includes: determining, by a controller, whether an ISG function activation condition is satisfied depending on vehicle running state information of the vehicle, where the vehicle running state information includes: whether the manual transmission is engaged with gears, whether a clutch signal or a bottom signal of a clutch pedal sensor is generated, a current vehicle speed, and a recorded vehicle speed of the vehicle; stopping an engine, by the controller, when the ISG function activation condition is satisfied; determining, by the controller, whether a first starting condition in which a shift stage of the manual transmission is a neutral stage is satisfied; determining, by the controller, whether a second starting condition in which a shift stage of the manual transmission is a driving stage is satisfied; and restarting, by the controller, the engine when the first starting condition or the second starting condition is satisfied.

The ISG function activation condition may be satisfied when the controller determines that the shift stage of the manual transmission is the neutral stage, an operation signal of the clutch pedal sensor is not generated, the current vehicle speed is less than a predetermined first vehicle speed, and the recorded vehicle speed exceeds a predetermined second vehicle speed, depending on the vehicle running state information.

The first starting condition may be satisfied when the controller determines that the shift stage of the manual transmission is the neutral stage and the clutch pedal sensor outputs a top signal or a bottom signal in an off state, depending on the vehicle running state information in a state where the ISG function is activated to stop the engine.

The first starting condition may be satisfied when the controller determines that the shift stage of the manual transmission is a travel stage and a bottom signal of the clutch pedal sensor is outputted in an off state, depending on the vehicle running state information in a state where the ISG function is activated to stop the engine.

An another form of the present disclosure, a vehicle implementing an ISG function includes: a vehicle operation state detector including a shift sensor that detects a shift stage of a manual transmission to output a corresponding signal, a clutch pedal sensor that outputs a top signal or a bottom signal based on an operation of a clutch pedal, a brake pedal sensor that detects an operation of a brake pedal to output a corresponding signal, and a vehicle speed sensor that measures a vehicle speed to output a corresponding signal; an injector configured to inject fuel into an engine; an operation motor connected to the engine to selectively start the engine; a controller configured to control the injector and the operation motor based on the corresponding signals from the vehicle operation state detector; and a memory configured to communicate with the controller to record a vehicle speed. In particular, based on the corresponding signals from the vehicle operation state detector, the controller determines that an ISG function activation condition is satisfied when the shift stage of the manual transmission is a neutral stage, an operation signal of the clutch pedal sensor is not generated, and a current vehicle speed is lower than a predetermined first reference vehicle speed, and the vehicle speed recorded in the memory is higher than a predetermined second reference vehicle speed, and when the ISG function activation condition is satisfied, the controller controls the injector to stop fuel injection into the engine.

After the engine stops, the controller may determine whether a first starting condition in which the shift stage of the manual transmission is a neutral stage is satisfied, may determine whether a second starting condition in which the shift stage of the manual transmission is a driving stage is satisfied, and may restart the engine when the first starting condition or the second starting condition is satisfied.

The controller may restart the engine when the controller determines that the shift stage of the manual transmission is the neutral stage and the clutch pedal sensor outputs a top signal or a bottom signal in an off state, depending on the vehicle running state information in a state where the ISG function is activated to stop the engine.

The controller may restart the engine when the controller determines that the shift stage of the manual transmission is the travel stage and a bottom signal of the clutch pedal sensor is outputted in the off state, depending on the vehicle running state information in a state where the ISG function is activated to stop the engine.

The operation motor may be a MHSG (mild hybrid starter generator).

In accordance with the method for controlling the ISG function of a vehicle provided with the manual transmission according to an exemplary form of the present disclosure and a vehicle to which the method is applied, a period in which the engine is stopped may be extended, and the engine may be smoothly restarted to improve driving convenience.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
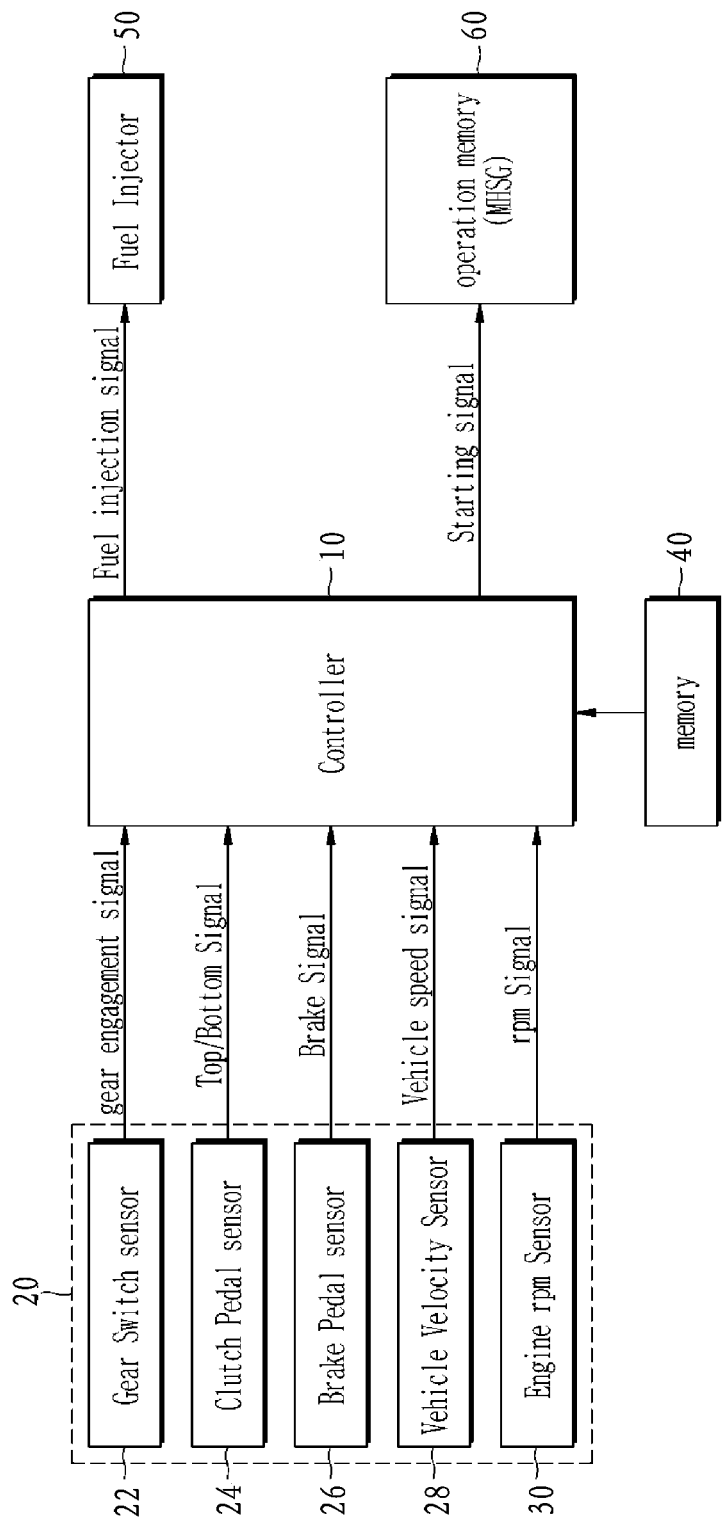
FIG. 1 illustrates a block diagram of a manual transmission vehicle to which an ISG function is applied according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

For better understanding of the present disclosure, and to show more clearly how it may be carried into effect, reference will now be made, by way of examples, to the accompanying drawings which show exemplary forms of the present disclosure.

Hereinafter, the present disclosure will be described in detail by describing exemplary forms of the present disclosure with reference to accompanying drawings. In the following description of the present disclosure, when a detailed description of known configurations or functions may obscure the subject matter of the present disclosure, a detailed description thereof will be omitted.

It is also to be understood that the terminology used herein is only for the purpose of describing particular forms, and is not intended to be limiting of the present disclosure. Singular forms are to include plural forms unless the context clearly indicates otherwise. It will be further understood that terms "comprises" and "have" used in the present specification specify the presence of stated features, numerals, steps, operations, components, parts, or combinations thereof, but do not preclude the presence or addition of one or more other features, numerals, steps, operations, components, parts, or combinations thereof.

Throughout this specification and the claims that follow, when it is described that an element is "coupled/connected" to another element, the element may be "directly coupled/connected" to the other element or "indirectly coupled/connected" to the other element through a third element.

All terms used herein including technical or scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

The constituent elements or "units" or blocks or modules used in an exemplary form of the present disclosure are software such as tasks, classes, subroutines, processes, objects, threads of execution, and programs performed in a given area of memory. They may be implemented in hardware, such as field-programmable gate arrays (FPGAs), or application-specific integrated circuits (ASICs), or may be a combination of the software and hardware. The constituent elements or "-parts" may be included in a computer-readable storage medium, or some of them may be distributed in a plurality of computers.

Figure 2:
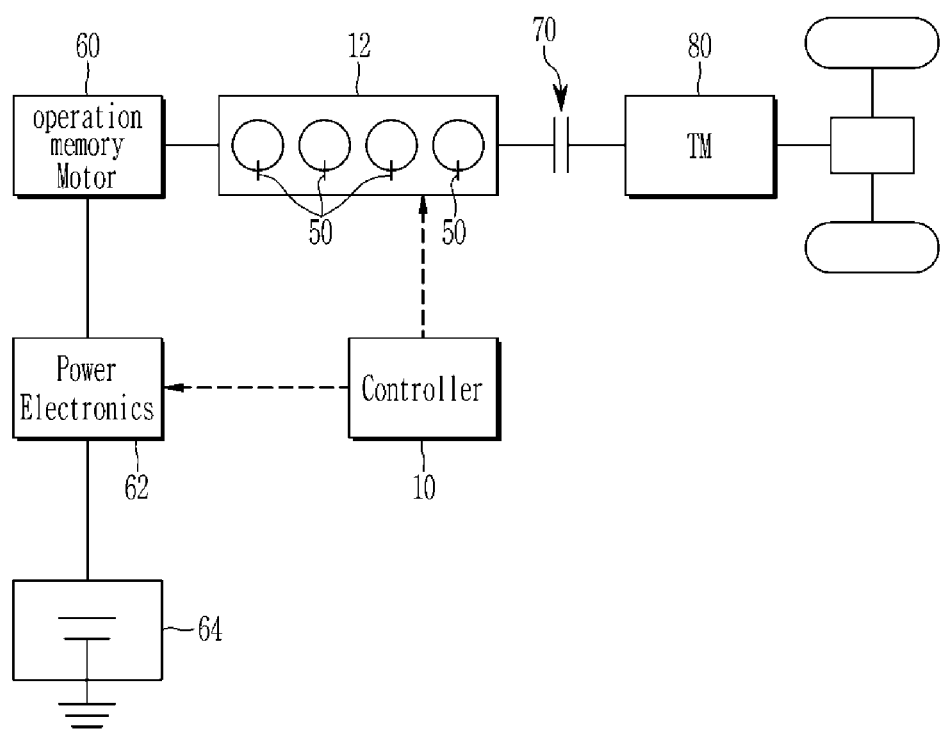
FIG. 2 illustrates a manual transmission vehicle to which an ISG function is applied according to an exemplary form of the present disclosure.

FIG. 1 illustrates a block diagram of a manual transmission vehicle to which an ISG function is applied according to an exemplary form of the present disclosure, and FIG. 2 illustrates a schematic diagram of a manual transmission vehicle to which an ISG function is applied according to an exemplary form of the present disclosure.

Referring to FIG. 1 and FIG. 2, a vehicle with a manual transmission to which an ISG (idle stop and go) function is applied includes: a vehicle operation state detector 20 configured to measure various conditions of the vehicle and to output a corresponding signal; an injector 50 configured to inject fuel into an engine 12; an operation motor 60 connected to the engine 12 to selectively start the engine 12; a controller 10 configured to control operations of the injector 50 and the motor 60 depending on an output signal of the vehicle operating state detector; and a memory 40 configured to communicate with the controller 10.

The controller 10 may be, e.g., at least one microprocessor (e.g., an electronic or engine control unit (ECU)) or hardware including a microprocessor, which is operated by a program, where the program may include a set of instructions for controlling a control method of a vehicle including an ISG function according to an exemplary form of the present disclosure. The instructions may be stored in the memory 40.

The vehicle operation state detector 20 includes: a shift sensor 22 configured to detect a shift stage of the manual transmission and output a corresponding signal, a clutch pedal sensor 24 configured to detect an operation of a clutch pedal and output a corresponding signal, a brake pedal sensor 26 configured to detect an operation of a brake pedal and output a corresponding signal, and a vehicle speed sensor 28 configured to measure a vehicle speed and output a corresponding signal. In addition, the vehicle operation state detector 20 may further include an rpm sensor 30 configured to measure rpm (revolutions per minute) of the engine and output a corresponding signal.

According to an exemplary form of the present disclosure, a vehicle provided with a manual transmission to which an ISG (idle stop and go) function is applied includes: a motor controller 62 configured to control an operation of the operation motor 60, a battery 64, a manual transmission 80, and a clutch 70 configured to selectively connect the manual transmission 80 and the engine 12.

The battery 64 may include a general 12 V battery, a 48 V battery for a mild hybrid, or a 12 V battery and a 48 V battery.

The operation motor 60 may be connected to the engine 12 through a gear or a belt, may be a starter motor that is applied to a general engine, and may start the engine 12 as an MHSG (mild hybrid starter & generator), or may assist power of the engine 12 and convert rotation energy of the engine 12 into electrical energy.

That is, the operation motor 60 may operate in various modes depending on a driving state of the vehicle, such as an engine starting mode, an engine torque assistance mode for operating as a motor to assist torque of the engine 12, a charging mode for charging a 48 volt battery that powers a vehicle's electrical load (electric load) and charges a 12 volt battery connected to a 48 volt battery through a low voltage DC-DC converter (LDC), a regenerative braking mode for charging a 48 volt battery, or an inertia driving mode for extending mileage. The operation motor 60 is controlled depending on the running state of the vehicle to maximize a fuel efficiency of the vehicle.

The motor controller 62 may include an inverter and/or a converter configured to receive power from the battery 64 to drive the operating motor 60 or transfer electricity generated from the operation motor 60 to the battery 64.

The shift sensor 22 detects whether the transmission 80 is in a neutral stage or an engaged stage (i.e., a driving stage), and outputs a corresponding signal.

The clutch pedal sensor 24 may include one or more sensors configured to detect a state in which the clutch pedal is not depressed, a state in which the clutch pedal is depressed, and a state in which the clutch pedal is fully depressed, and the clutch pedal sensor 24 outputs an electrical signal corresponding to the detected state.

In some forms of the present disclosure, the clutch pedal sensor 24 outputs a clutch engagement signal when the clutch pedal is not depressed, and outputs a top signal when the clutch pedal is depressed, and a bottom signal when the clutch pedal is fully depressed.

The top signal may be generated when a driver depresses the clutch pedal, and the bottom signal may be generated when the driver fully depresses the clutch pedal.

In the detailed description and claims of the present disclosure, it is defined as generation of the clutch engagement signal even when the clutch pedal is not depressed and thus there is no top signal or bottom signal.

The vehicle speed sensor 28 measures a current vehicle speed to output a corresponding signal, and records and stores the vehicle speed during driving (velocity history) in the memory 40.

Figure 3:
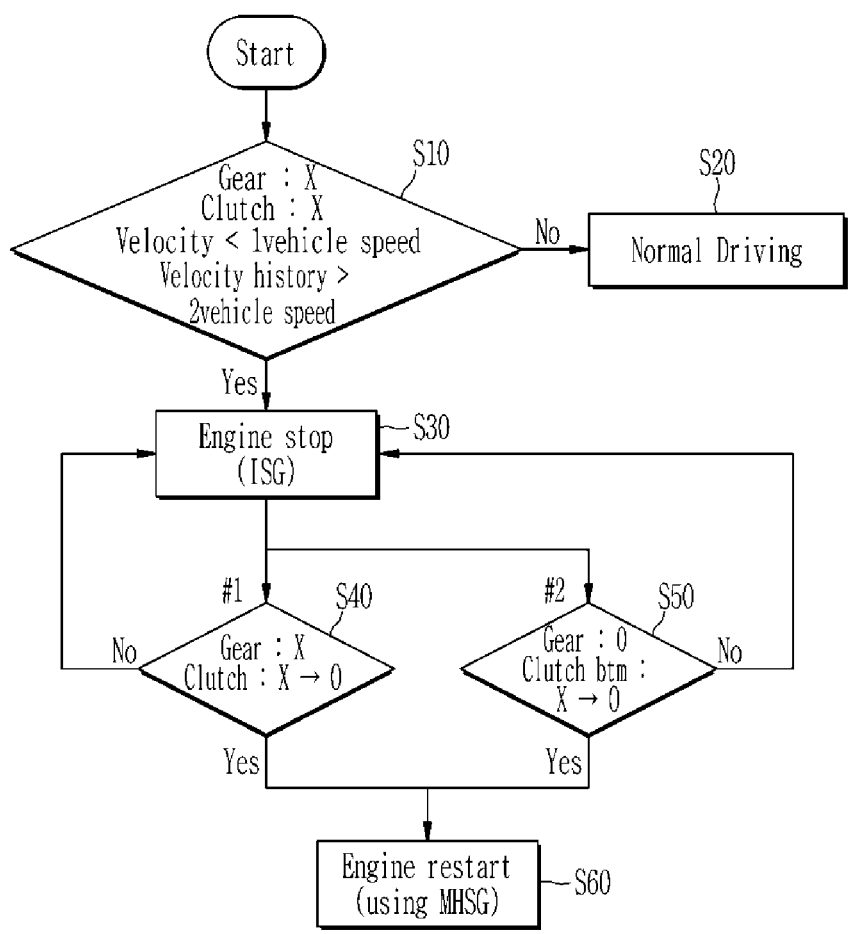
FIG. 3 illustrates a flowchart showing an ISG control method of a vehicle provided with a manual transmission according to an exemplary form of the present disclosure.

FIG. 3 illustrates a flowchart showing an ISG control method of a vehicle provided with a manual transmission according to an exemplary form of the present disclosure.

Hereinafter, an ISG control method of a vehicle provided with a manual transmission according to an exemplary form of the present disclosure will be described with reference to FIG. 1 to FIG. 3.

The ISG control method of the vehicle provided with the manual transmission includes: determining, by a controller 10, whether an ISG function activation condition is satisfied based on vehicle running state information, including whether the manual transmission 80 is engaged with gears, whether a clutch signal or a bottom signal of a clutch pedal sensor is generated, a current vehicle speed, and a recorded vehicle speed, which is outputted from the vehicle operation status detector 20 (S10); stopping an engine by allowing the controller 10 to activate the ISG function when the ISG function activation condition is satisfied (S30); determining, by the controller, whether a first starting condition #1 including a condition in which a shift stage of the manual transmission 80 is a neutral stage is satisfied (S40); determining by the controller 10 whether a second starting condition #2 including a condition in which a shift stage of the manual transmission 80 is a driving stage is satisfied (S50); and restarting the engine when the first starting condition #1 or the second starting condition #2 is satisfied (S60).

When the ISG function activation condition is not satisfied, the vehicle is controlled in a normal vehicle driving mode (Normal Driving) (S20).

It may be determined that the ISG function activation condition is satisfied when the shift stage of the manual transmission is the neutral stage, an operation signal of the clutch pedal sensor is not generated, the current vehicle speed is less than the predetermined first vehicle speed, and the recorded vehicle speed exceeds the predetermined second vehicle speed.

The first vehicle speed is predetermined in consideration of whether the driver intends to decelerate or stop the vehicle, and is compared with the current vehicle speed, and may be set to, e.g., around 7 kph, but the present disclosure is not limited thereto.

The second vehicle speed is predetermined in consideration of whether the driver intends to decelerate or stop the vehicle, and is compared with a vehicle speed recorded during operation of the vehicle, and may be set to, e.g., around 7 kph, but the present disclosure is not limited thereto.

When it is determined depending on vehicle running state information outputted from the vehicle operation status detector 20 that the shift stage of the manual transmission 80 is the neutral stage, a clutch is engaged, the current vehicle speed is less than the predetermined first vehicle speed, and the recorded vehicle speed exceeds the predetermined second vehicle speed, the controller 10 determines that the driver intends to decelerate or stop the vehicle, that is, the ISG function activation condition is satisfied, and controls an operation of the injector 50 to stop the engine 12 (S30).

When the engine 12 is stopped, that is, when fuel injection is stopped, fuel efficiency of the vehicle may be improved and generation of harmful exhaust gas may be reduced.

After the ISG function is activated, that is, after the engine is stopped, the engine may be restarted depending on start intention of the driver, and in accordance with the ISG control method of the vehicle provided with the manual transmission according to the exemplary form of the present disclosure, when either of the first starting condition (#1) or the second starting condition (#2) is satisfied, the engine 12 may be restarted (S60) to facilitate driving convenience.

When it is determined depending on vehicle running state information outputted from the vehicle operation status detector 20 that the shift stage of the manual transmission 80 is the neutral stage and the clutch pedal sensor 24 outputs a top signal or a bottom signal in an off state (S40), the controller 10 interprets that the driver intends to drive the vehicle and restarts the engine 12 (S60).

That is, in the state in which the manual transmission 80 is in neutral, when the driver depresses the clutch pedal, it is interpreted as having the intention to operate the vehicle and the engine 12 is restarted (S60).

In addition, when it is determined depending on vehicle running state information outputted from the vehicle operation status detector 20 that the manual transmission 80 is engaged and the bottom signal of the clutch pedal sensor 24 is outputted in the off state (S50), the controller 10 interprets that the driver intends to drive the vehicle and restarts the engine 12 (S60).

That is, when the clutch is fully depressed, that is, when the bottom signal is outputted after stop of the vehicle, i.e., gear engagement of the manual transmission 80, the controller 10 interprets that the driver intends to drive the vehicle and restarts the engine 12 (S60).

A general ISG system operates when the brake is operated and the vehicle speed is about 5 kph or less, so the fuel efficiency reduction is limited, but in accordance with the ISG control method of the vehicle provided with the manual transmission according to the exemplary form of the present disclosure, regardless of the brake operation, the ISG function may be activated or deactivated to facilitate driving, and a speed of the ISG function-activated vehicle may be extended to about 7 kph.

In addition, in accordance with the ISG control method of the vehicle provided with the manual transmission according to the exemplary form of the present disclosure, it is possible to restart the engine even when the gear is engaged (i.e., in the driving stage), or is released (in the neutral state), thereby achieving the driver's convenience.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

| | |
|---|---|
| 10: controller | 12: engine |
| 20: vehicle operation state detector | 22: shift sensor |
| 24: clutch pedal sensor | 26: brake pedal sensor |
| 28: vehicle speed sensor | 30: rpm sensor |
| 40: memory | 50: injector |
| 60: operation motor | 62: motor controller |
| 64: battery | 70: clutch |
| 80: transmission | |

What is claimed is:

1. A control method of controlling an idle stop-and-go (ISG) function of a vehicle provided with a manual transmission, the control method comprising:
   determining, by a controller, whether an ISG function activation condition is satisfied based on vehicle running state information of the vehicle, where the vehicle running state information includes: whether the manual transmission is engaged with gears, whether a top signal or a bottom signal of a clutch pedal sensor is generated, a current vehicle speed, and a recorded vehicle speed of the vehicle;
   stopping an engine, by the controller, when the ISG function activation condition is satisfied;
   determining, by the controller, whether a first starting condition in which a shift stage of the manual transmission is a neutral stage is satisfied;
   determining, by the controller, whether a second starting condition in which the shift stage of the manual transmission is a driving stage is satisfied; and
   restarting, by the controller, the engine when the first starting condition or the second starting condition is satisfied.

2. The control method of claim 1, wherein:
   the ISG function activation condition is satisfied when the controller determines that the shift stage of the manual transmission is the neutral stage, an operation signal of the clutch pedal sensor is not generated, the current vehicle speed is less than a predetermined first vehicle speed, and the recorded vehicle speed exceeds a predetermined second vehicle speed.

3. The control method of claim 1, wherein:
   in a state where the ISG function is activated to stop the engine, the first starting condition is satisfied when the controller determines that the shift stage of the manual transmission is the neutral stage and the clutch pedal sensor outputs the top signal or the bottom signal in an off state.

4. The control method of claim 1, wherein:
   in a state where the ISG function is activated to stop the engine, the second starting condition is satisfied when the controller determines that the shift stage of the manual transmission is the driving stage and the bottom signal of the clutch pedal sensor is outputted in an off state.

5. A vehicle implementing an idle stop-and-go (ISG) function and provided with a manual transmission, the vehicle comprising:
   a vehicle operation state detector including:
   a shift sensor configured to detect a shift stage of the manual transmission and output a corresponding signal,
   a clutch pedal sensor configured to output a top signal or a bottom signal based on an operation of a clutch pedal,
   a brake pedal sensor configured to detect an operation of a brake pedal and output a corresponding signal, and
   a vehicle speed sensor configured to measure a vehicle speed and output a corresponding signal;
   an injector configured to inject fuel into an engine;

an operation motor connected to the engine and configured to selectively start the engine;

a controller configured to control the injector and the operation motor based on the corresponding signals from the vehicle operation state detector; and a memory configured to communicate with the controller and configured to record the vehicle speed, wherein:

based on the corresponding signals from the vehicle operation state detector, the controller is configured to: determine that an ISG function activation condition is satisfied when the shift stage of the manual transmission is a neutral stage, an operation signal of the clutch pedal sensor is not generated, and a current vehicle speed is lower than a predetermined first reference vehicle speed, and the vehicle speed recorded in the memory is higher than a predetermined second reference vehicle speed, and when the ISG function activation condition is satisfied, the controller is configured to control the injector to stop fuel injection into the engine.

6. The vehicle of claim 5, wherein after the engine stops, the controller is configured to:

determine whether a first starting condition in which the shift stage of the manual transmission is the neutral stage is satisfied, determine whether a second starting condition in which the shift stage of the manual transmission is a driving stage is satisfied, and restart the engine when the first starting condition or the second starting condition is satisfied.

7. The vehicle of claim 5, wherein in a state where the ISG function is activated to stop the engine, the controller is configured to restart the engine when the controller determines that the shift stage of the manual transmission is the neutral stage and the clutch pedal sensor outputs the top signal or the bottom signal in an off state.

8. The vehicle of claim 5, wherein in a state where the ISG function is activated to stop the engine, the controller is configured to restart the engine when the controller determines that the shift stage of the manual transmission is a travel stage and the bottom signal of the clutch pedal sensor is outputted in an off state.

9. The vehicle of claim 5, wherein the operation motor is a mild hybrid starter generator (MHSG).

* * * * *